(12) United States Patent
Crisler, III et al.

(10) Patent No.: US 6,897,406 B2
(45) Date of Patent: May 24, 2005

(54) ELECTRIC WELDER

(75) Inventors: Howard E. Crisler, III, Antioch, TN (US); Roger L. DeYoung, Franklin, TN (US); David J. Moore, Mt. Juliet, TN (US); James A. Nutter, Lebanon, TN (US); Matthew L. Rivera, Mableton, GA (US)

(73) Assignee: Campbell Hausfeld/Scott Fetzer, Harrison, OH (US)

( * ) Notice: Subject to any disclaimer, the term of this patent is extended or adjusted under 35 U.S.C. 154(b) by 0 days.

(21) Appl. No.: 10/394,691

(22) Filed: Mar. 21, 2003

(65) Prior Publication Data

US 2004/0182845 A1 Sep. 23, 2004

(51) Int. Cl.[7] .................................................. B23K 9/10
(52) U.S. Cl. .................................... 219/130.1; 219/136
(58) Field of Search .............................. 219/86.21, 116, 219/130.1, 136

(56) References Cited

U.S. PATENT DOCUMENTS

| | | | |
|---|---|---|---|
| 2,157,871 A | * | 5/1939 | Steinert .................... 219/130.1 |
| 2,253,403 A | | 8/1941 | Steinert |
| D161,912 S | | 2/1951 | Fotie |
| 2,866,076 A | | 12/1958 | Aversten |
| 2,883,498 A | * | 4/1959 | Crep ............................ 338/95 |
| 3,227,979 A | * | 1/1966 | Kamp ......................... 336/133 |
| 3,492,455 A | * | 1/1970 | Brundage .................... 219/116 |
| 3,510,623 A | * | 5/1970 | Wolgast .................... 219/86.21 |
| 3,523,272 A | | 8/1970 | Jost et al. |
| 4,107,635 A | | 8/1978 | Brundage et al. |
| 4,443,187 A | | 4/1984 | Shaftner et al. |
| D275,293 S | | 8/1984 | Bouman |
| D280,329 S | | 8/1985 | Bouman |
| 4,804,811 A | * | 2/1989 | Raycher et al. .......... 219/130.1 |
| 5,452,908 A | | 9/1995 | Bencic |
| 6,051,806 A | | 4/2000 | Shikata et al. |
| 6,170,839 B1 | | 1/2001 | Kizewski |
| 6,396,019 B1 | | 5/2002 | Williams |
| 6,596,972 B1 | * | 7/2003 | Di Novo et al. ............. 219/136 |

* cited by examiner

*Primary Examiner*—Clifford C. Shaw
(74) *Attorney, Agent, or Firm*—Jones Day

(57) ABSTRACT

A welder comprises a source of electrical welding current. A housing houses the source and has front and rear walls and a top wall. A control device, for controlling a condition of the welder, is located along the top wall. A rear wheel is attached to the housing and has a portion located both rearward and downward from the housing. This enables the welder to pivot about the rear wheel between an upright position and a lying position. A front wheel and a foot are attached to the housing. In the upright position, the front and rear wheels engage the floor to support the housing above and spaced from the floor. In the lying position, the rear wheel and the foot engage the floor to support the housing above and spaced from the floor.

24 Claims, 9 Drawing Sheets

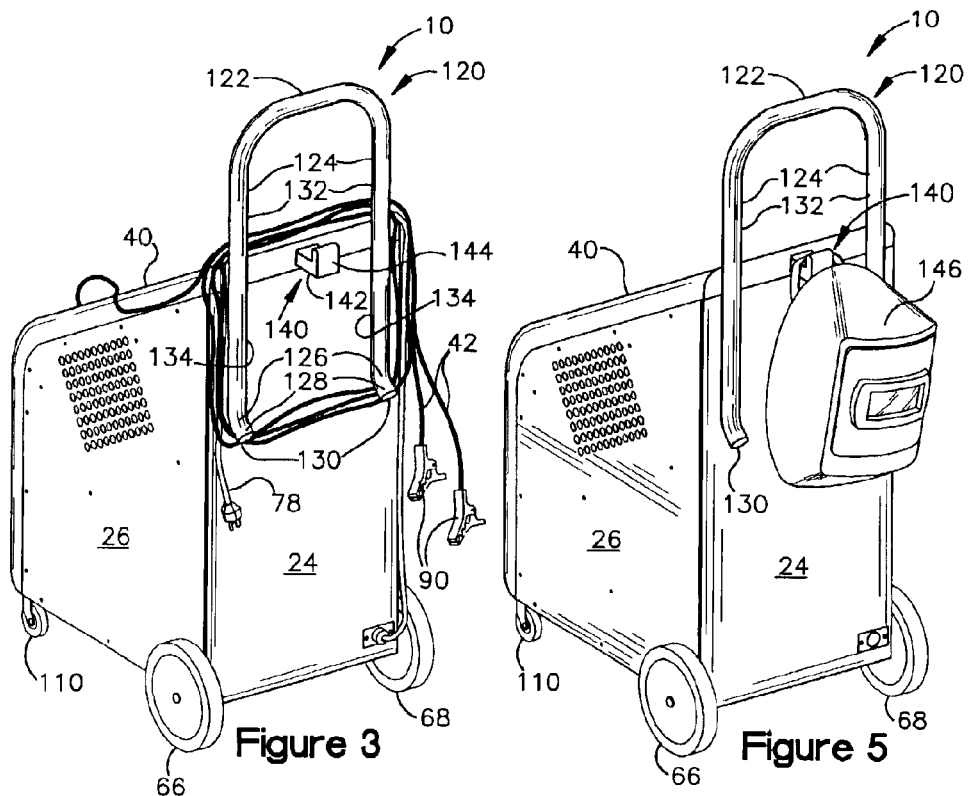
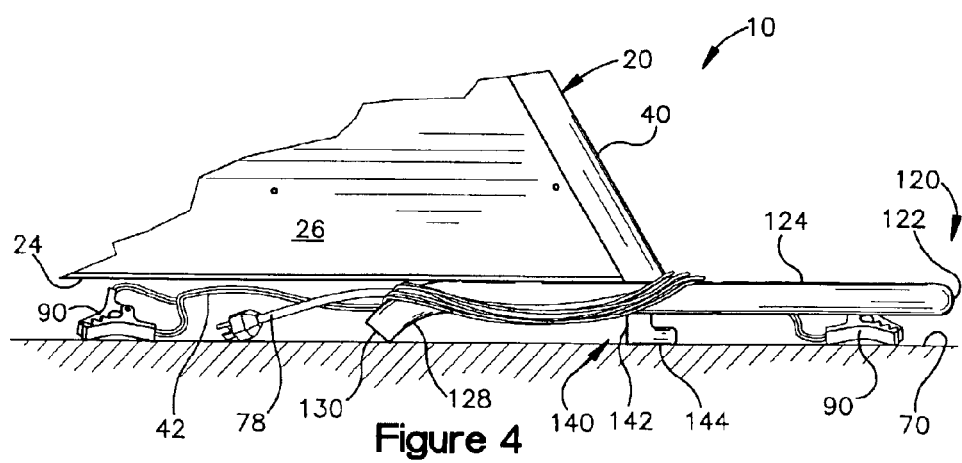

ELECTRIC WELDER

TECHNICAL FIELD

The present invention relates to electric welders.

BACKGROUND

A welder is used to weld a metal work piece. The welder produces an electrical welding current. The welding current is conducted to the work piece by a first cable and to a welding rod by a second cable. The current flows through the work piece and the rod when they contact each other. The work piece and the rod are thus heated and melted together.

SUMMARY

A welder embodying the present invention comprises a source of electrical welding current. A housing houses the source and has front and rear walls and a top wall. A control device, for controlling a condition of the welder, is located along the top wall. A rear wheel is attached to the housing and has a portion located both rearward and downward from the housing. This enables the welder to pivot about the rear wheel between an upright position and a lying position. A front wheel and a foot are attached to the housing. In the upright position, the front and rear wheels engage the floor to support the housing above and spaced from the floor. In the lying position, the rear wheel and the foot engage the floor to support the housing above and spaced from the floor.

Preferably, a handle attached to said housing is spaced from the floor in both the upright and lying positions. The handle and the foot are parts of a single bent bar. The top wall is inclined, extending rearward and upward with reference to the upright position of the welder.

In accordance with another aspect of the invention, the top wall is inclined. Located along the top wall are a device for selecting a nominal value of the welding current, a device for displaying the nominal value of the welding current, a switch for turning on the welder, a device for indicating when the welder is turned on, and a thermal overload indicator light.

Preferably, the welder further comprises a compartment for storing welding accessories, extending downward from an opening in said top wall.

In another aspect of the invention, a wheel is attached to the housing. The wheel is configured for wheeling the housing about a floor and also for pivoting the welder about the wheel between the upright position and the lying position. The welder has two compartments for storing welding accessories, configured such that, in either of the upright and lying positions of the welder, an opening of one of the compartments faces upward and an opening of the other of the compartments faces horizontally.

In another aspect, the housing has a front wall and an inclined top wall extending rearward and upward from the front wall. A compartment extends rearward from the front wall.

In yet another aspect, a support structure is attached to the housing. The support structure is configured to serve as a hook for hanging an accessory in the upright position of the welder and also as a foot for supporting the housing above the floor in the lying position of the welder.

In another embodiment of the invention, an apparatus comprises a transformer for producing an electrical current. The transformer comprises primary and secondary windings wound about a core. A shunt is configured to control the current by movement of the shunt along an axis into and out of the core within a predetermined full range of travel. A control device is configured to be rotated by an operator about the axis for controlling the current. A mechanical linkage is connected between the shunt and the control device. The linkage is configured to effect the movement of the shunt by rotation of the device such that the predetermined full range of travel of the shunt corresponds to multiple revolutions of the device.

According to another aspect of the invention, a shunt is for selecting a nominal value of the current by movement of the shunt along an axis into and out of the core. The apparatus further comprises a hand-movable control device. A first mechanical linkage connects the control device to the shunt such that a movement of the control device causes the movement of the shunt, whereby the nominal value of the current can be selected by the movement of the control device. The apparatus further comprises a rotatable pointer. A second mechanical linkage connects the pointer to the shunt such that the movement of the shunt causes a rotation of the pointer such that the nominal value is indicated by an angular position of the pointer. The first linkage is different from the second linkage.

In another aspect, the apparatus comprises a gage and a helical band extending axially from the gage. A bracket is connected to the shunt, and has a slit that receives the helical band closely and slidingly such that the axial movement of the shunt causes a corresponding rotation of the band.

BRIEF DESCRIPTION OF THE DRAWINGS

FIG. 3 is a rear perspective view of the welder in the upright position, illustrating a first use of the welder;

FIG. 4 is a partial side view of the welder in the lying position, illustrating the first use of the welder;

FIG. 5 is a rear perspective view of the welder in the upright position, illustrating a second use of the welder;

DESCRIPTION

The apparatus 10 shown in FIG. 1A has parts which, as described below, are examples of the elements recited in the claims. The apparatus 10 is a welder. The welder 10 is described as follows with reference to an upright position of the welder 10 shown in FIG. 1A.

Figure 1A:
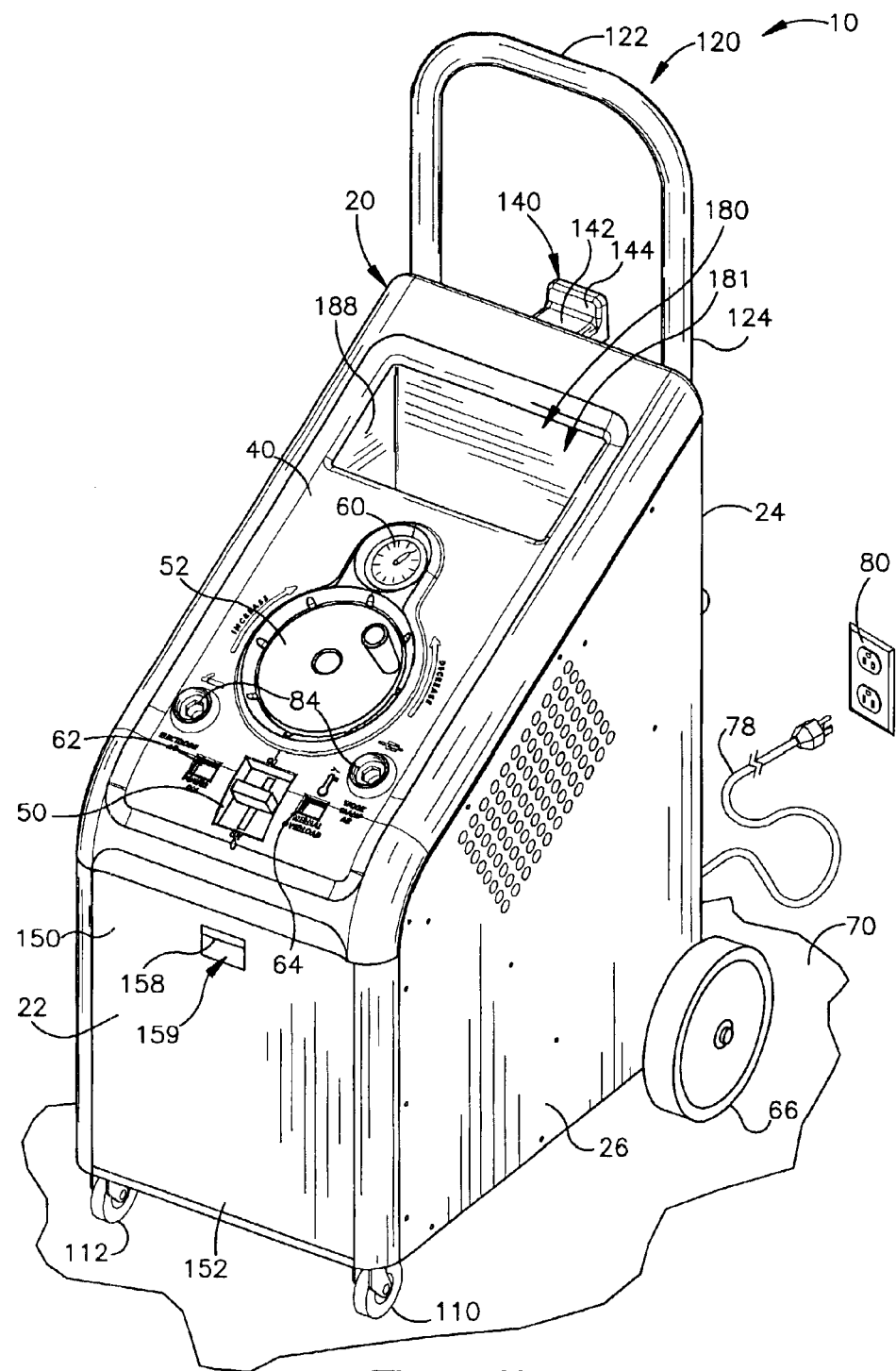
FIG. 1A is a front perspective view of a welder embodying the present invention, shown in an upright position.
Figure 1B:
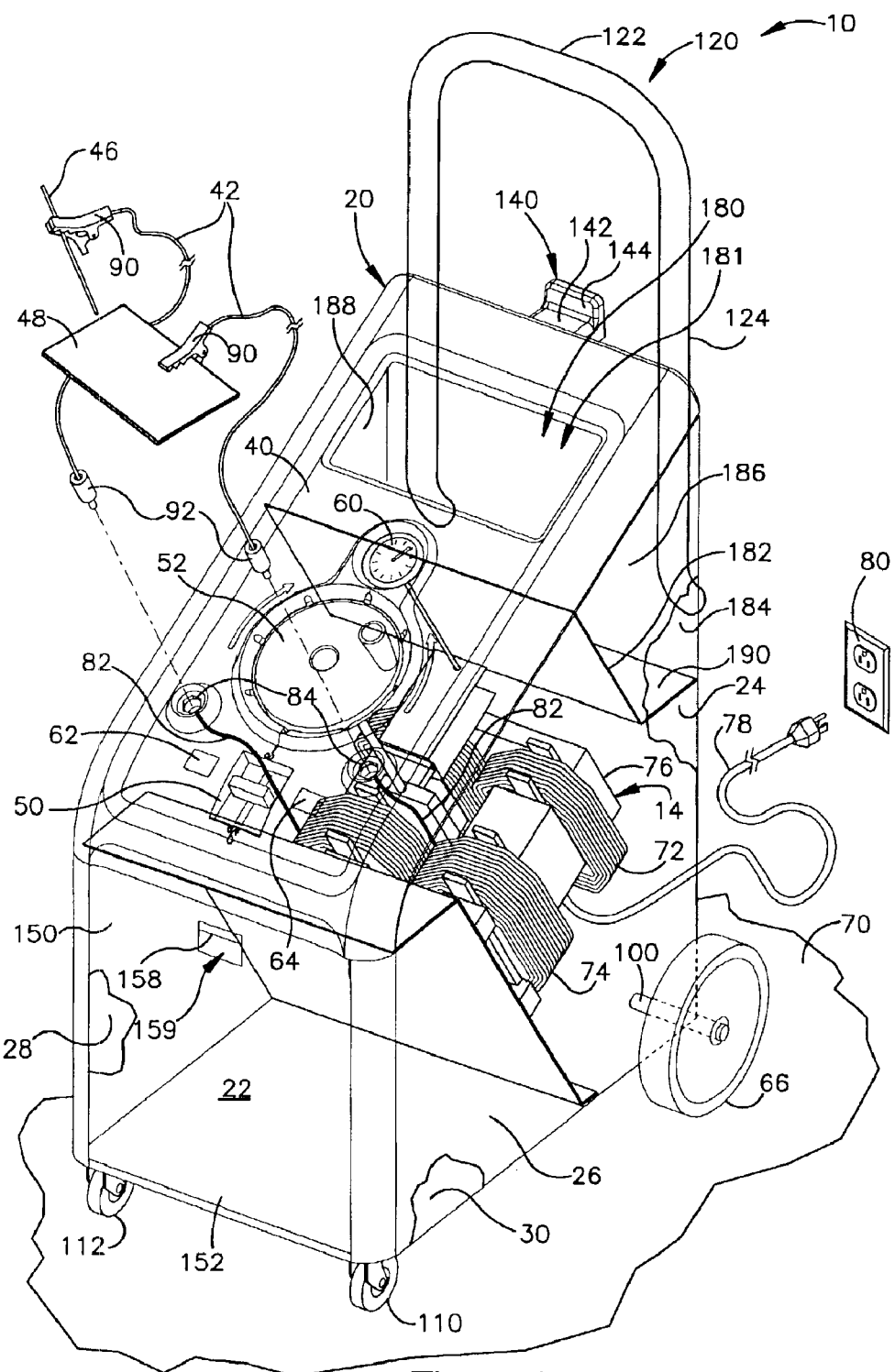
FIG. 1B is a view similar to FIG. 1A, in which certain walls of the welder are rendered transparent in order to show internal parts of the welder.

As shown in FIG. 1B, the welder 10 has a source 14 of electrical welding current contained within a housing 20. The housing 20 has front and rear walls 22 and 24, two opposite side walls 26 and 28, a bottom wall 30 and an inclined top wall 40. Two cables 42 extend outward from the housing 20 to conduct the welding current from the source 14 to a welding rod 46 and a work piece 48 for welding the work piece 48. First and second control devices 50 and 52 are located along the top wall 40. The control devices 50 and 52 are accessible and viewable by an operator and used by the operator to manually control operating conditions of the welder 10. First, second and third display devices 60, 62 and 64 are also located along the top wall 40. They are viewable by the operator and display operating conditions of the welder 10. Two rear wheels 66 and 68 (FIG. 3), for wheeling the welder 10 about a floor 70, are attached to the housing 20.

The source 14 of the welding current in this example is a transformer. The transformer 14 comprises primary windings 72 and secondary windings 74 wound about a steel core 76. The primary windings 72 are powered by an electrical input current provided by a power cord 78 plugged into a wall socket 80. The secondary windings 74 output the welding current through two output lines 82 to two jacks 84. The two jacks 84 extend through holes in the top wall 40 of the housing 20.

Each welding cable 42 is connected at one end to a clamp 90 that can be clamped to the welding rod 46 or the work piece 48. The welding cable 42 is connected at the opposite end to a plug 92 that can be plugged into a respective jack 84.

Figure 2A:
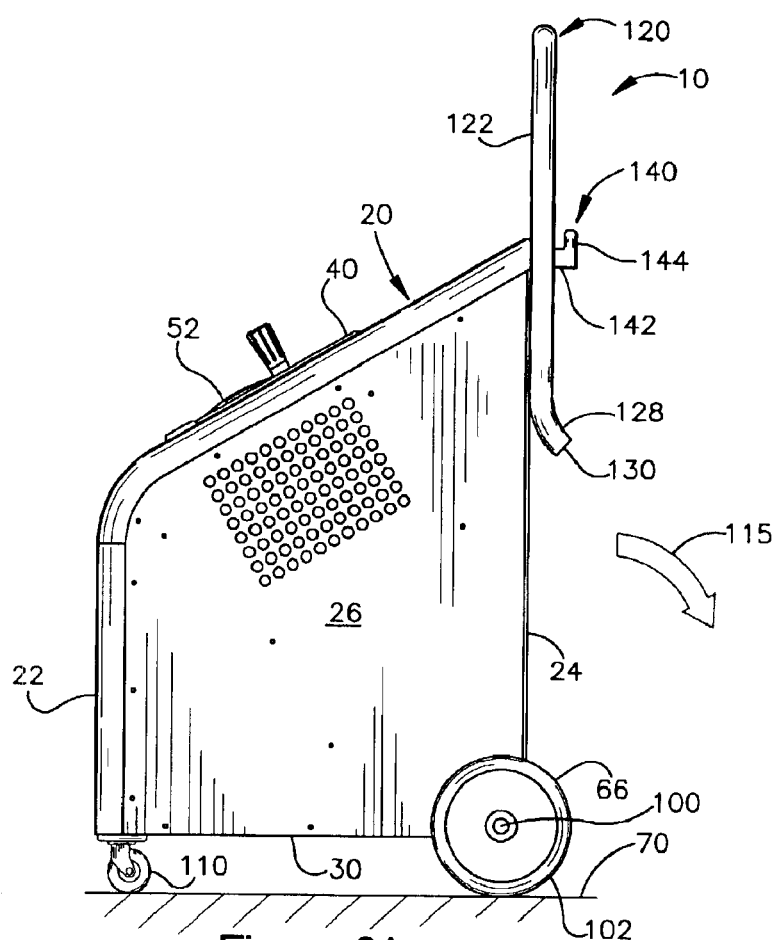
FIG. 2A is a side view of the welder in the upright position.

The rear wheels 66 and 68 rotate about respective shafts 100, as shown in FIG. 2A. Each shaft 100 projects outwardly from, and perpendicular to, a respective one of the side walls 26 and 28. The wheels 66 and 68 are configured, in terms of size and location, such that a portion 102 of each wheel is located both rearward and downward from the housing 20.

Two front wheels 110 and 112 (FIG. 1B) are attached to the bottom wall 30 forward from the two rear wheels 66 and 68. In the example, the front wheels 100 and 112 are castors and thus swiveable. The front and rear wheels 66, 68, 110 and 112 together enable the operator to push, pull and maneuver the welder 10 about the floor 70.

Figure 2B:
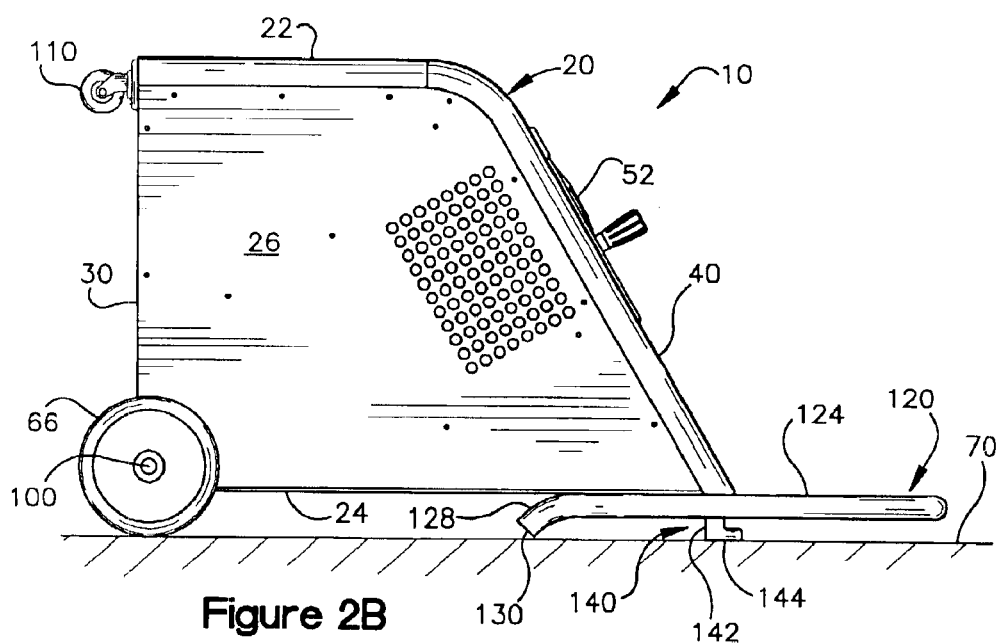
FIG. 2B is a side view of the welder in a lying position.

The welder 10 can pivot about the wheel axles 100, and thus about the rear wheels 66 and 68, as indicated by an arrow 115, from the upright position shown in FIG. 2A to a lying position shown in FIG. 2B. The rear wall 24 is visually vertical when the welder 10 is in the upright position (FIG. 2A), and visually horizontal when the welder 10 is in the lying position (FIG. 2B). Herein, "visually" means as appearing to the casual observer, "vertical" means perpendicular to the floor, and "horizontal" means parallel with the floor. The welder 10 preferably rotates about 90 degrees when being pivoted from the upright position to the lying position.

The top wall 40 is inclined whether the welder 10 is in the upright position or the lying position. Specifically, when the welder 10 is in the upright position (FIG. 2A), the top wall 40 extends rearward and upward, at about a 30 degree angle from horizontal, from the front wall 22. The top wall 40 thus faces the operator's eyes when the operator stands in front of the welder 10. This directs the control and display devices 50, 52, 60, 62 and 64 (FIG. 1A) toward the operator's eyes. This facilitates grasping the control devices 50 and 52 and viewing the display devices 60 and 62. When the welder 10 is in the lying position (FIG. 2B), the top wall 40 is inclined such that the top wall 40 faces the operator's eyes as the operator is kneeling or lying.

A multifunctional support 120, shown in FIG. 3, is attached to the rear wall 24. As described with reference to the upright position of the welder 10 shown in FIG. 3, the support 120 comprises a horizontally-extending bridging bar 122. From opposite ends of the bridging bar 122, two side bars 124 extend downward. From bent bottom ends 126 of the side bars 124, two turned-out bars 128 extend downward and rearward to a distal end 130 of the support 120. An upper portion 132 of each side bar 124 extends vertically above the rear wall 24. A lower portion 134 of each side bar extends alongside, and affixed to, the rear wall 24. The support 120 serves several functions, described as follows.

The bridging bar 122 serves as a handle. It can be grasped by hand to wheel the welder 10 about the floor 70 and to pivot the welder 10 about the rear wheels 66 and 68 between the upright and lying positions (FIGS. 2A and 2B).

The side bars 122 and the turned-out bars 128 together serve as a bracket for wrapping the welding cables 42 and the power cord 78 for storage. As shown in FIG. 3, the cables 42 and the cord 78 are wrapped such that they are lodged from above between the top of the rear wall 24 and the side bars 124. The cables 42 and the cord 78 are lodged from below between the rear wall 24 and the turned-out bars 128. When the cables 42 and the cord 78 are wrapped sufficiently tightly in this fashion, they will remain securely in place even when the welder 10 is in the lying position as shown in FIG. 4. In this position, the cables 42 and the cord 78 will be retained above the floor 70 by the side bars 124 and the turned-out bars 128.

The turned-out bars 128 also serve as feet for the welder 10 when the welder 10 is in the lying position as shown in FIGS. 2B and 4. The turned-out bars 128 are configured, together with the rear wheels 66 and 68, to support the rear wall 24 and the bridging bar 122 above the floor 70 when the welder 10 is in the lying position. This protects the rear wall 24 from damage by debris on the floor 70 and facilitates grasping of the bridging bar 122 to pivot the welder 10 upward. At the location on each turned-out bar where it contacts the floor 70, the turned-out bar 128 includes a material, such as plastic, that avoids scratching of the floor 70. Additionally, the turned-out bars 128 are configured, relative to the rear wheels 66 and 68, to orient the rear wall 24 and the side bars 124 parallel with the floor 70 when the welder 10 is in the lying position.

An L-shaped hook 140, shown in FIG. 3, is attached to the rear wall 24 at the top of the rear wall 24. With reference to the upright position of the welder 10, the hook 140 comprises a horizontal leg 142 extending from the rear wall 24 rearward and a vertical leg 144 extending from the horizontal leg 142 upward. As shown in FIG. 5, the hook 140 can be used to hang a welding accessory, such as a helmet 146, when the welder 10 is in the upright position. As shown in FIGS. 2B and 4, the hook 140 can also serve as a foot when the welder 10 is in the lying position. Like the turned-out bar 128, the hook 140 is configured relative to the rear wheels 66 and 68 to support the rear wall 24 and the bridging bar 122 above, and spaced from, the floor 70 when the welder 10 is in the lying position. As explained above, this protects the rear wall 24 from damage and facilitates grasping of the bridging bar 122. The hook 140 is further configured relative to the rear wheels 66 and 68 to orient the rear wall 24 and the side bars 124 parallel with the floor 70. Where the hook 140 contacts the floor 70, the hook 140 includes a material that avoids scratching of the floor 70, such as plastic.

Figure 6:
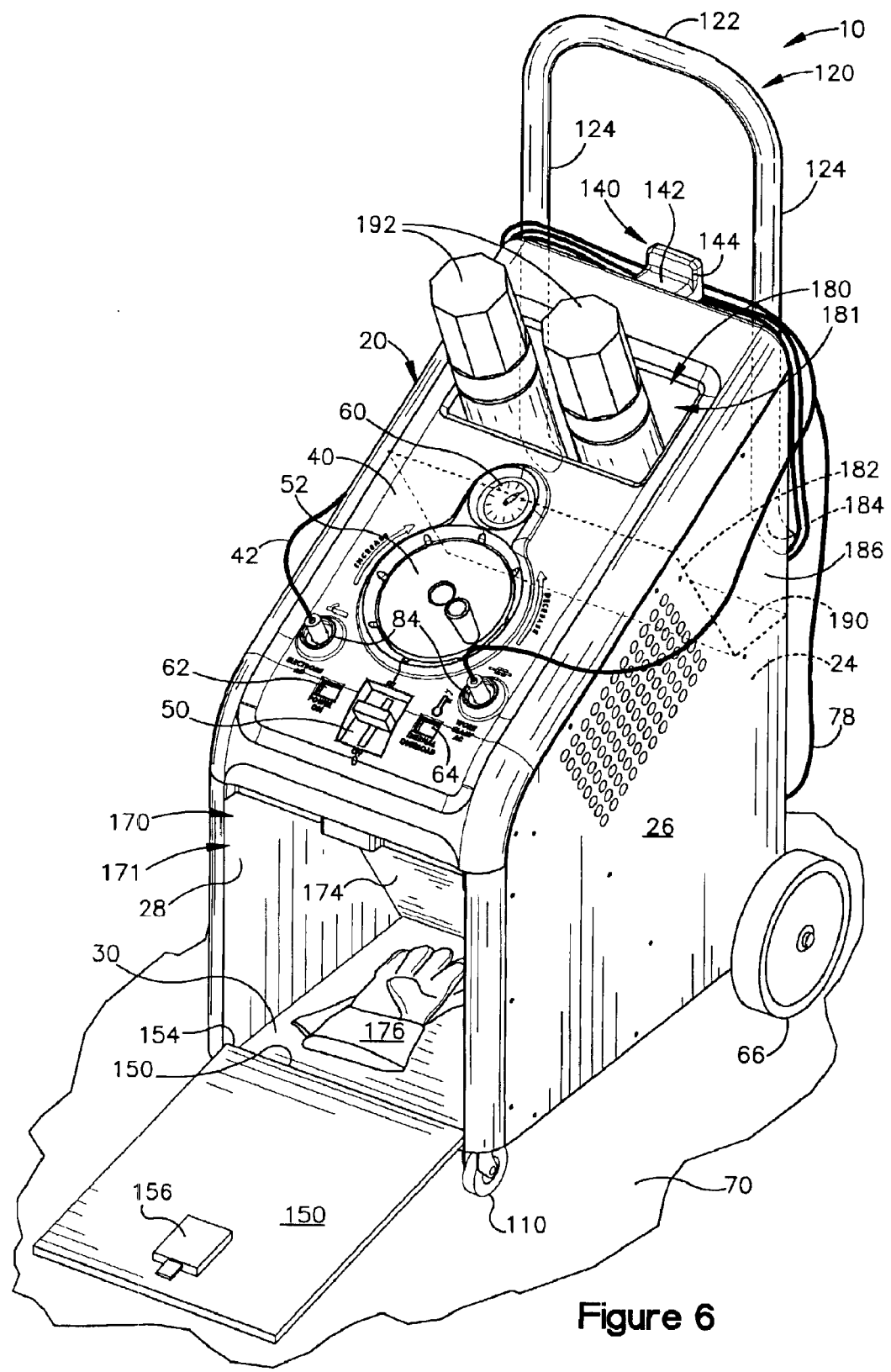
FIG. 6 is a view similar to FIG. 1A, illustrating other uses of the welder.

The front wall 22 is defined by a door panel 150, shown in a closed position in FIG. 1A and in an open position in FIG. 6. A lower end 152 of the door panel 150 is attached to the housing 20 by a hinge 154. The door panel 140 can pivot about the hinge 154 between the closed and open positions. The panel 150 is secured in the closed position by a door latch 156 affixed to the panel 150. The latch 156 is released by a finger grip 158 (FIG. 1) located in a recess 159 in the front face of the door panel 150.

A lower compartment 170, shown in FIG. 6, extends rearward from a rectangular front opening 171 in the housing 20. The lower compartment 170 is bounded by the side walls 26 and 28, the bottom wall 30 and an inclined rear wall 174. The compartment 170 is further bounded by the door panel 150 when the door panel 150 is in the closed position.

The lower compartment 170 can be used to store welding accessories such as gloves 176. The top wall 40 being inclined to face the operator, along with the lower compartment 170 extending rearward from the front wall 22, provides convenient access to the devices 50, 52, 60, 62 and 64 and the compartment 170 by the operator with minimal need for the operator to reposition himself.

An upper compartment 180 extends downward from a generally-rectangular opening 181 in the top wall 40 near the rear wall 24. The upper compartment 180 is defined by front and rear walls 182 and 184 (FIG. 1B), two side walls 186 and 188, and a bottom wall 190. The front wall 182 of the compartment 180 is inclined, extending from the top wall 40 downward and rearward to the bottom wall 190 of the compartment 180. The rear wall 184 of the upper compartment 180 is a portion of the rear wall 24 of the housing 20. Similarly, the side walls 186 and 188 of the upper compartment 180 are portions of the side walls 26 and 28 of the housing 20. The upper compartment 180 can be used to store welding accessories such as two containers 192 containing welding rods.

The arrangement of the aforementioned features of this embodiment provides several conveniences. All of the control and display devices 50, 52, 60, 62 and 64 of the welder 30, along with the top storage compartment 180, are located along the same wall 40, the top wall 40. Consequently, all of these features are conveniently viewed and accessed by the operator without the operator having to change his position. Viewing and accessing these features is further facilitated by the top wall 40 being inclined to face the operator in both the upright and lying positions of the welder, when the operator is standing or kneeling, respectively.

Another convenience is that the compartments 170 and 180 are located such that, in either position of the welder 10, the opening 171 and 181 of one of the compartments 170 and 180 faces upward and the opening 171 and 181 of the other of the compartments 170 and 180 faces horizontally. Specifically, when the welder 10 is in the upright position (FIG. 2A), the opening 181 of the upper compartment 180 faces upward and the opening 171 of the lower compartment 170 faces horizontally. Similarly, when the welder 10 is in the lying position (FIG. 2B), the opening 171 of the lower compartment 170 faces upward and the opening 181 of the upper compartment 180 faces horizontally. This provides the operator with access to storage both from above and from the side, in either position of the welder 10.

Figure 7:
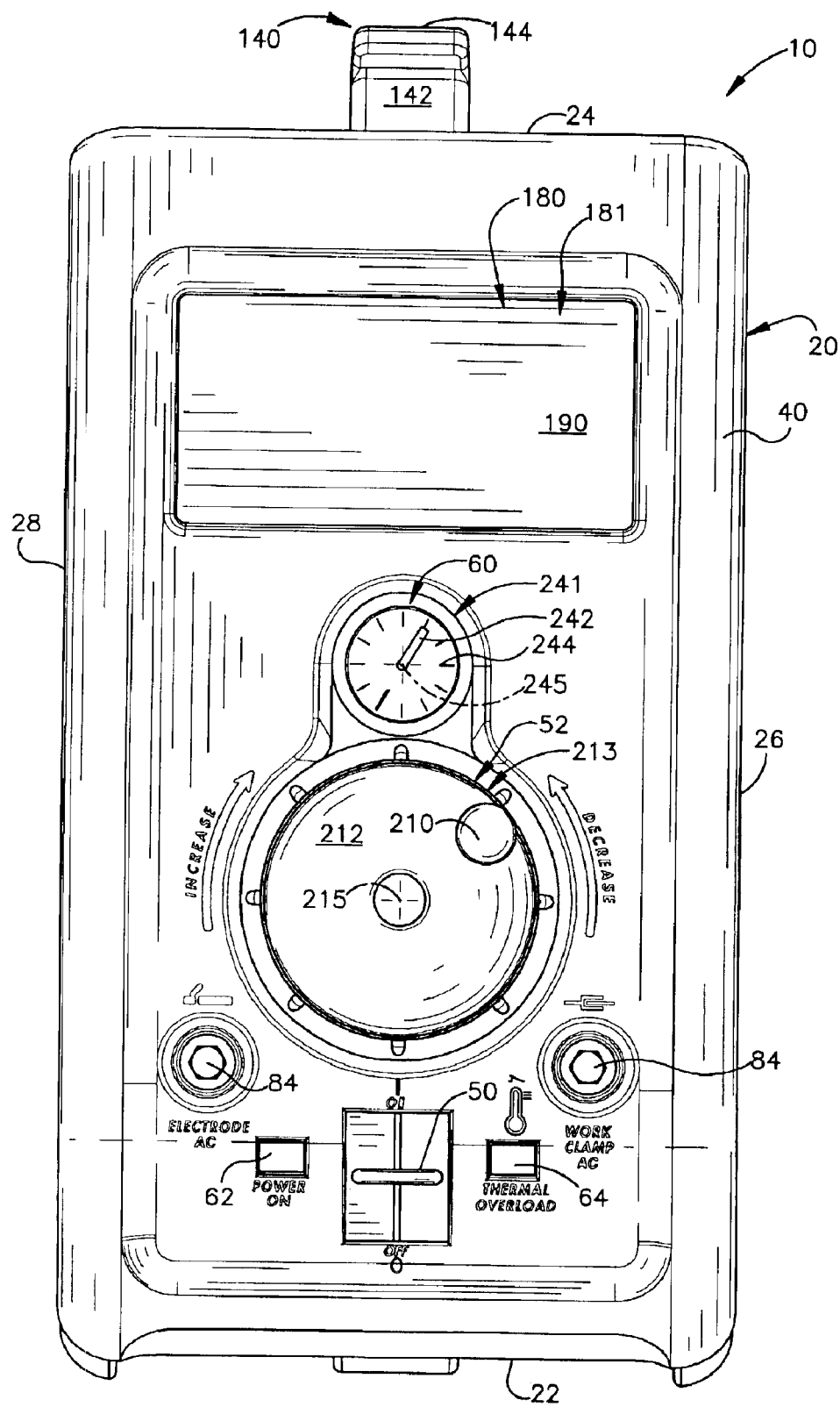
FIG. 7 is a head-on view of a top wall of the welder.

The first control device 50 is a power switch, shown in FIG. 7, used to turn the welder 10 on and off. In this example, the power switch 50 is located near the front of the top wall 40, equidistant from the side walls 26 and 28 and also equidistant from the two jacks 84.

The second control device 52, shown in FIG. 7, is used by the operator to control the welding current. This device 52 is a crank wheel comprising a knob 210 projecting from a disk 212. The crank wheel 52 is located along the top wall 40 of the housing 20 and projects through an opening 213 in the top wall 40. The crank wheel 52 is equidistant from the side walls 26 and 28 and also equidistant from the two jacks 84. The crank wheel 52 is rotatable about an axis 215 perpendicular to the top wall 40.

Figure 8:
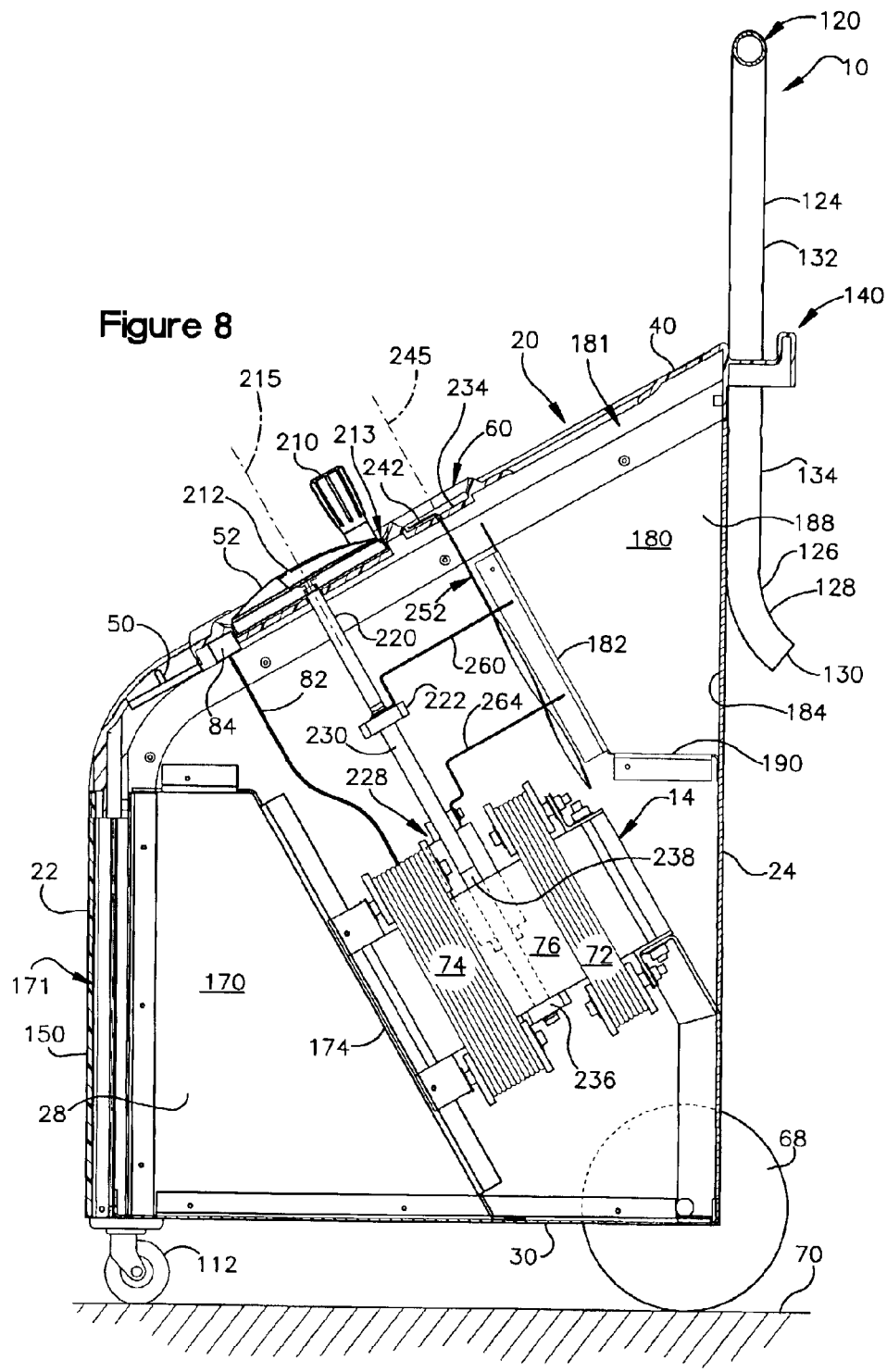
FIG. 8 is a side sectional view of the welder.
Figure 9A:
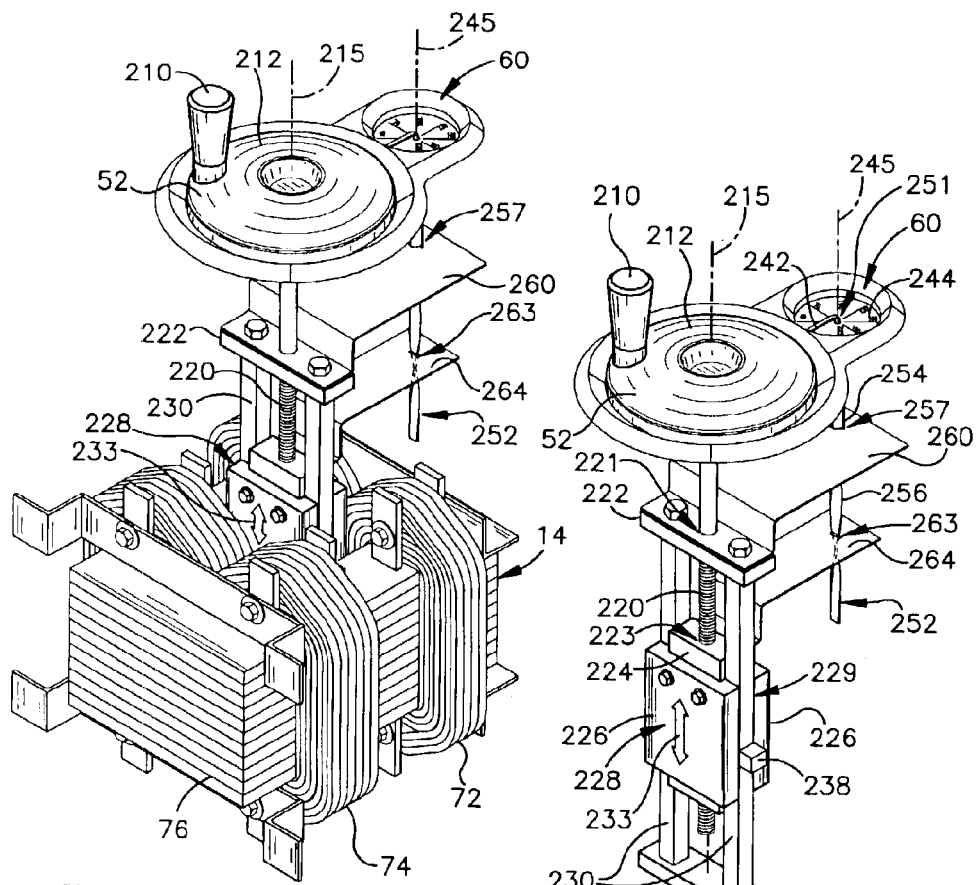
FIG. 9A is a perspective view of parts shown in FIG. 8.
Figure 9B:
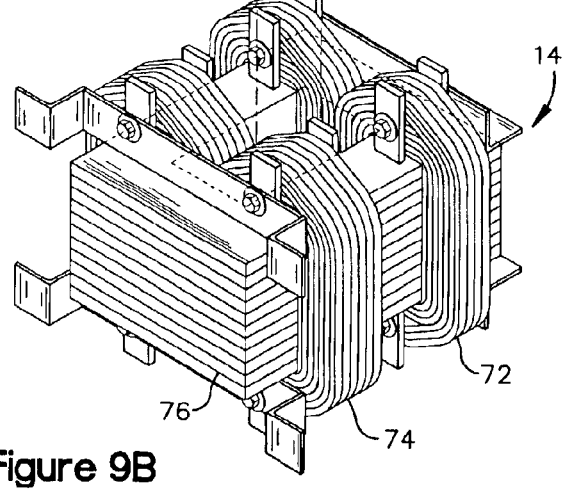
FIG. 9B is a partially-exploded view of the parts shown in FIG. 9A.
Figure 10:
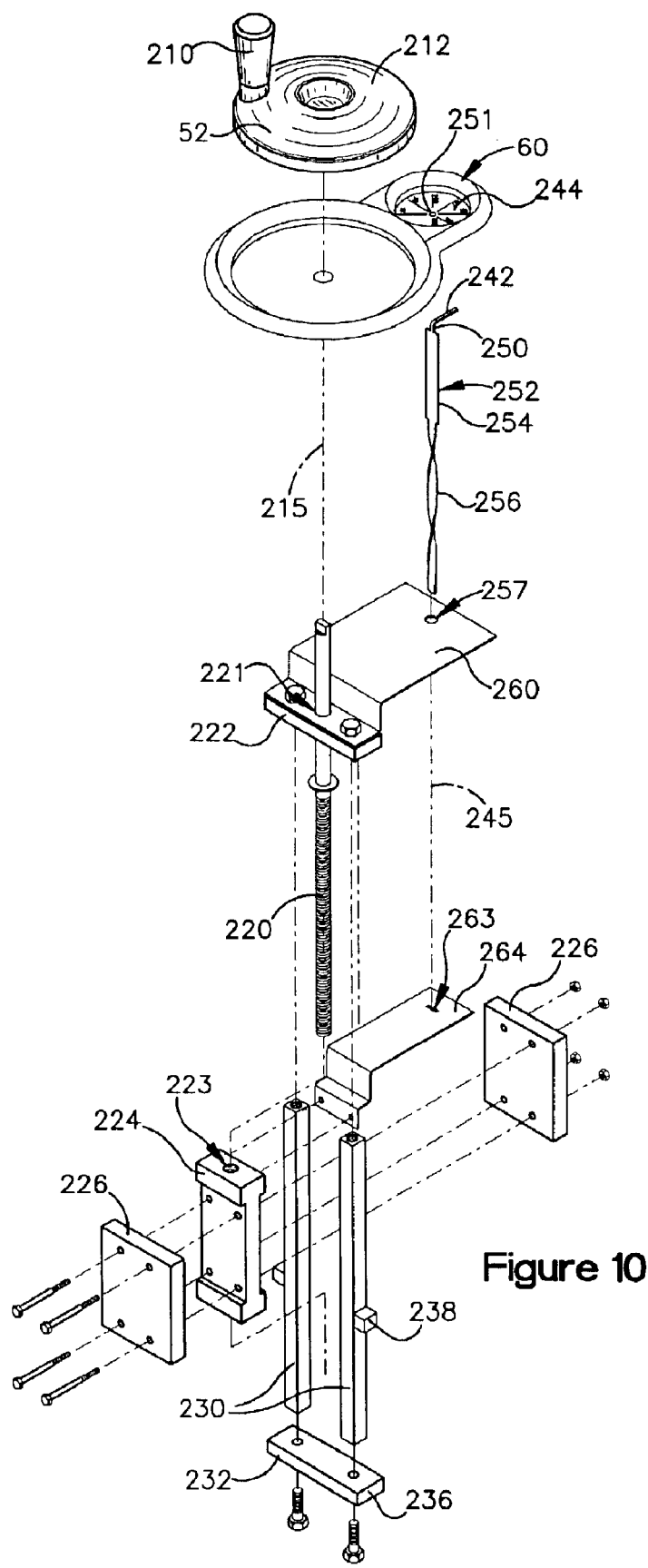
FIG. 10 is a more fully exploded view of parts shown in FIG. 9B.

The mechanism that the second control devise 52 uses to control the welding current is shown in a side view in FIG. 8 and in various perspective views in FIGS. 9A, 9B and 10. Referring to FIG. 9B, an externally threaded rotatable lead screw 220 extends axially downward from the crank wheel 52. It extends through a hole 221 in a stationary block 222 into, and engaged with, a threaded hole 223 of a sliding block 224. The sliding block 224 is sandwiched in-between two shunt pieces 226. Each shunt piece 226 comprises a stack of laminated steel. A shunt assembly 228, or shunt, comprises the sliding block 222 and the shunt pieces 226. The shunt 228 has two channels 229, each defined by the sliding block 222 and the shunt pieces 226. Each channel 229 is configured to closely receive a respective guide rail 230 extending axially downward from the stationary block 222 to an end piece 232. This enables the shunt 228 to slide axially along the rails 230 while preventing the shunt 228 from rotating. As shown in FIG. 8, when assembled, the transformer core 76 is captured between two extensions 236 of the end piece 232 from below and two transversely-extending extensions 238 of the rails 230 from above.

As indicated by an arrow 233 in FIG. 9A, rotation of the crank wheel 52, and thus the lead screw 220, about the axis 215 causes the shunt 228 to slide axially downward into or axially upward out of the transformer core 76. The shunt 228 can thus slide over a predetermined full range of travel of the shunt 228. The output current is inversely related to the penetration of the shunt 228 into the core 76. Accordingly, the operator can control the welding current by rotating the crank wheel 52. Rotating the crank wheel 52 clockwise decreases the penetration of the shunt 228 into the core 76, which increases the welding current. Conversely, rotating the crank wheel 52 counterclockwise increases penetration of the shunt 228 into the core 76, which decreases the welding current. Accordingly, the operator can use the crank wheel 52 to select a nominal welding current value. The value is only "nominal" because the actual welding current can vary to some extent based on welding conditions such as the type of welding rod or work piece.

Because the above mechanism employs a lead screw to move of the shunt 228, the predetermined full range of travel of the shunt 228 corresponds to multiple, i.e., two or more, revolutions of the crank wheel 52. The range of arcuate travel of the knob 210 is much longer than the corresponding full range of linear travel of the shunt 228. This provides several advantages over mechanisms in which the full range of travel of the shunt corresponds to only one revolution, or a portion of a revolution, of a control knob or corresponds to linear motion of a control knob fixed to the shunt. Relative to those other mechanisms, this embodiment requires less force by the operator to move the shunt 228, due to the mechanical advantage provided by the lead screw 222. Also, the lead screw 228 prevents the weight of the shunt 228 from urging the crank wheel 52 to move out of its set position, thus avoiding the need to lock the crank wheel 52 in place. Also, the greater arcuate travel of the knob 210 relative to that of the shunt 228 enables fine-tuning of the position of the shunt 228.

The first display 60, shown in FIG. 7, is a rotary-type dial gage that displays the nominal value of the welding current based on the position of the shunt 228 (FIG. 8). The gage 60 is located along the top wall 40 and is received in a hole 241 in the top wall 40. The gage 60 is located rearward from the crank wheel 52 and equidistant from the side walls 26 and 28. The gage 60 has a rotatable pointer 242 and a round dial 244 graduated in units of electrical current, specifically amps. The pointer is rotatable about an axis 245 extending through the center of the dial 244 and perpendicular to the top wall 40. The axis 245 of the gage 60 is thus parallel with the axis 215 of the crank wheel 52.

The gage 60 functions through a mechanism shown in side view in FIG. 8 and in various perspective views in FIGS. 9A, 9B and 10. Referring to FIG. 10, the pointer 242 is connected to a short narrow axially-extending neck 250. The neck 250 extends through a hole 251 in the dial 244 to a rotatable axially-extending band 252. The band 252 has a wider flat section 254 and a narrower helical section 256. The helical section 256 extends through a round hole 257 in a stationary bracket 260 secured to the stationary block 222.

The holes 251 and 257 in the dial 244 and the stationary bracket 260 are diametrically smaller than the width of the flat section 244.

When assembled, as shown in FIG. 9B, the stationary bracket 260 is positioned such that the wider flat section is captured closely between the dial 244 and the stationary bracket 260. This prevents axial movement of the band 252 while enabling rotation of the band 252 about the axis 215. The helical section 256 further extends through a slit 263 in a movable bracket 264 that is attached to the sliding block 224 of the shunt 228. The slit 263 receives the helical section 256 closely and slidingly. Consequently, axial movement of the shunt 228 causes a corresponding rotation of the band 252 and thus the pointer 242. Accordingly, as shown in FIG. 9A, the angular position of the pointer 242 is a function of the axial position of the shunt 228 relative to the core 76. The position of the pointer 242 thus indicates the nominal value of the welding current.

The second display device 62, shown in FIG. 7, is a power-on indicator light located along the top surface 40 to the left of the power switch 50. The power-on indicator light 62 lights to indicate the welder 10 is turned on.

The third display device 64 is a thermal overload indicator light located along the top surface 40 to the right of the power switch 50. The thermal overload indicator light 64 lights to indicate that output current is being interrupted by an internal thermal protection device (not shown) to protect the transformer 14 from thermal overload.

While the various features of the invention are shown and described in specific positions and configurations, many of the features may take on other locations and configurations, the invention not being limited to the specific examples shown and described. Furthermore, it should be understood that the features may be used singly or in any combination.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have elements that do not differ from the literal language of the claims, or if they include equivalent structural elements with insubstantial differences from the literal language of the claims.

What is claimed is:

1. A welder comprising:
   a source of electrical welding current;
   a housing that houses the source and has front and rear walls and top and bottom walls;
   rear wheels attached to the housing for wheeling the housing about a floor and for pivoting the housing rearwardly about the rear wheels from an upright position to a lying position;
   a handle structure extending upward from the rear wall; and
   a foot attached to the rear wall and configured, in the lying position of the housing, to engage the floor and space the handle structure above the floor.

2. The welder of claim 1 wherein the rear wall is vertical when the welder is in the upright position and horizontal when the welder is in the lying position.

3. The welder of claim 1 wherein the handle structure and the foot are parts of a single bent bar.

4. The welder of claim 1 wherein the foot includes a bar extending rearward and downward from the rear wall, such that a cable can be wrapped and lodged from above between the rear wall and the handle structure and from below between the rear wall and the foot.

5. The welder of claim 1 wherein the foot extends rearward and upward from the rear wall to function as a hook for hanging a welding accessory.

6. The welder of claim 1 wherein the handle structure includes first and second side bars extending upward from the rear wall.

7. The welder of claim 6 wherein the side bars are vertical.

8. The welder of claim 1 wherein the handle structure includes a horizontal bar located above and parallel with the rear wall.

9. The welder of claim 1 wherein the top wall is inclined, extending rearward and upward from the front wall.

10. The welder of claim 1 further comprising, at the top wall, control devices for controlling conditions of the welder.

11. The welder of claim 1 wherein the housing has two compartments for storing accessories, configured such that, in both the upright and lying positions of the welder, an opening of one of the compartments faces upward arid an opening of the other of the compartments faces horizontally.

12. A welder comprising:
    a source of electrical welding current;
    a housing that houses the source and has front and rear walls and top and bottom walls;
    rear wheels attached to the housing for wheeling the housing about a floor; and
    a handle structure configured to be grasped by hand to wheel the housing about the floor, including first and second side bars extending upward from the rear wall; and
    an accessory hook located between the side bars, extending rearward and upward from the rear wall and configured for hanging a welding accessory.

13. The welder of claim 12 wherein the hook has a top end that is rearward from and lower than a top end of the handle structure.

14. The welder of claim 12 wherein the housing can pivot rearwardly about the rear wheels from an upright position to a lying position, and the handle structure can be grasped by hand to pivot the welder into and out of the lying position.

15. The welder of claim 14 wherein, in the lying position of the housing, the hook engages the floor and spaces the side bars above the floor.

16. The welder of claim 14 wherein the side bars are vertical in the upright position of the housing and horizontal and spaced from the floor in the lying position of the housing.

17. The welder of claim 14 wherein the handle structure includes a horizontal bridging bar extending from a top end of the first side bar to a top end of the second side bar and is spaced above the floor when the housing is in the lying position.

18. A welder comprising:
    a source of electrical welding current;
    a housing that houses the source and has front and rear walls and top and bottom walls;
    rear wheels attached to the housing for wheeling the housing about a floor; and
    a handle structure configured to be grasped by hand to wheel the housing about the floor, including first and second side bars extending upward from the rear wall; and
    first and second turned-out bars located respectively directly below the side bars and extending rearward and downward from the rear wall such that a welding cable can be wrapped and lodged from above between the rear wall and the side bars and from below between the rear wall and the turned-out bars.

19. The welder of claim 18 wherein the housing can pivot rearwardly about the rear wheels from an upright position to a lying position, and the handle structure can be grasped by hand to pivot the welder into and out of the lying position.

20. The welder of claim 19 wherein, in the lying position of the housing, the turned-out sections engage the floor and space the side bars above the floor.

21. The welder of claim 19 wherein the side bars are vertical in the upright position of the housing and horizontal and spaced from the floor in the lying position of the housing.

22. The welder of claim 19 wherein the side bars and turned-out bars are sections of a single bent bar.

23. The welder of claim 19 further comprising a horizontal bridging bar extending from a top end of the first side bar to a top end of the second side bar, that is spaced above the floor when the housing is in the lying position.

24. A welder comprising:

a source of electrical welding current;

a housing that houses the source and has front and rear walls and top and bottom walls;

a control device at the top wall for selecting a welding current;

a display device at the top wall for displaying the welding current; and a storage compartment extending downward from an opening in the top wall, rearward of the control and display devices.

* * * * *

UNITED STATES PATENT AND TRADEMARK OFFICE
CERTIFICATE OF CORRECTION

PATENT NO. : 6,897,406 B2
DATED : May 24, 2005
INVENTOR(S) : Crisler, III et al.

It is certified that error appears in the above-identified patent and that said Letters Patent is hereby corrected as shown below:

Column 7,
Line 64, "wail" should read -- wall --.

Column 8,
Line 19, "arid" should read -- and --.

Column 9,
Line 15, insert -- the -- before "turned-out".

Signed and Sealed this

Eighteenth Day of April, 2006

JON W. DUDAS
*Director of the United States Patent and Trademark Office*